Figure 1:
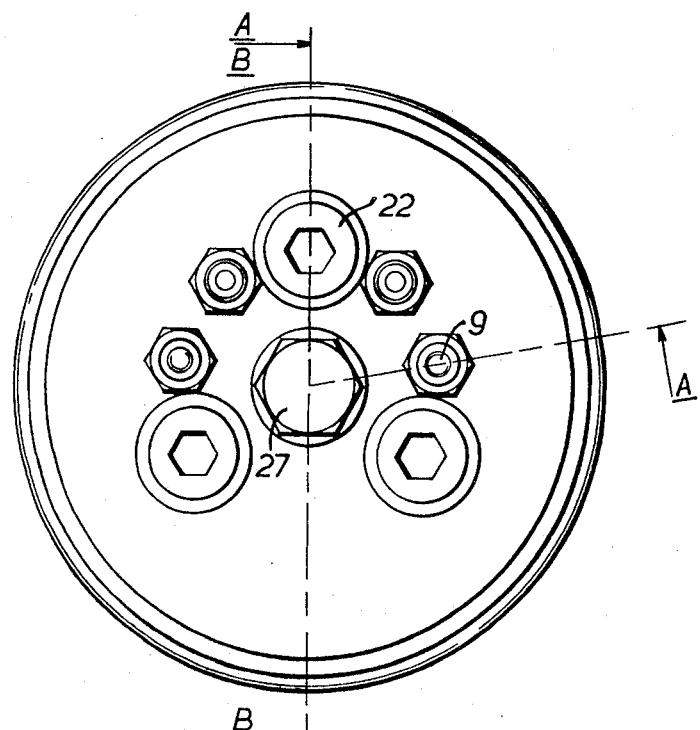

United States Patent [19]
Newstead et al.

[11] 3,858,488
[45] Jan. 7, 1975

[54] VEHICLE BRAKE ACTUATORS

[75] Inventors: Charles Newstead; Andrew Charles Walden Wright, both of Birmingham, England

[73] Assignee: Girling Limited, Birmingham, England

[22] Filed: July 28, 1972

[21] Appl. No.: 275,964

[30] Foreign Application Priority Data
Oct. 14, 1971  Great Britain .................... 47855/71

[52] U.S. Cl. ...................... 92/61, 92/130, 188/170
[51] Int. Cl. .............................................. F01b 1/02
[58] Field of Search ................... 92/61, 64, 63, 130; 188/170

[56] References Cited
UNITED STATES PATENTS

| | | | |
|---|---|---|---|
| 3,485,537 | 12/1969 | Schlor et al. | 92/63 X |
| 3,576,152 | 4/1971 | Chevreux | 188/170 X |
| 3,712,181 | 1/1973 | Swander, Jr. et al. | 188/170 X |
| 3,717,072 | 2/1973 | Kaltenthaler et al. | 92/63 X |

FOREIGN PATENTS OR APPLICATIONS

| | | | |
|---|---|---|---|
| 1,220,272 | 6/1966 | Germany | 188/170 |
| 1,148,603 | 4/1969 | Great Britain | 92/64 |

Primary Examiner—Edgar W. Geoghegan
Assistant Examiner—Abraham Hershkovitz
Attorney, Agent, or Firm—Scrivener Parker Scrivener and Clarke

[57] ABSTRACT

A vehicle brake actuator comprises an output member which is subject to the action of a first piston working in a cylinder which is pressurised to apply the brake and the biasing force of a spring. A second piston works independently of the first piston in a second cylinder which is normally pressurised to relieve the output member of the spring biasing force. The first piston and the spring are arranged to act on the output member independently of and in parallel with each other.

6 Claims, 2 Drawing Figures

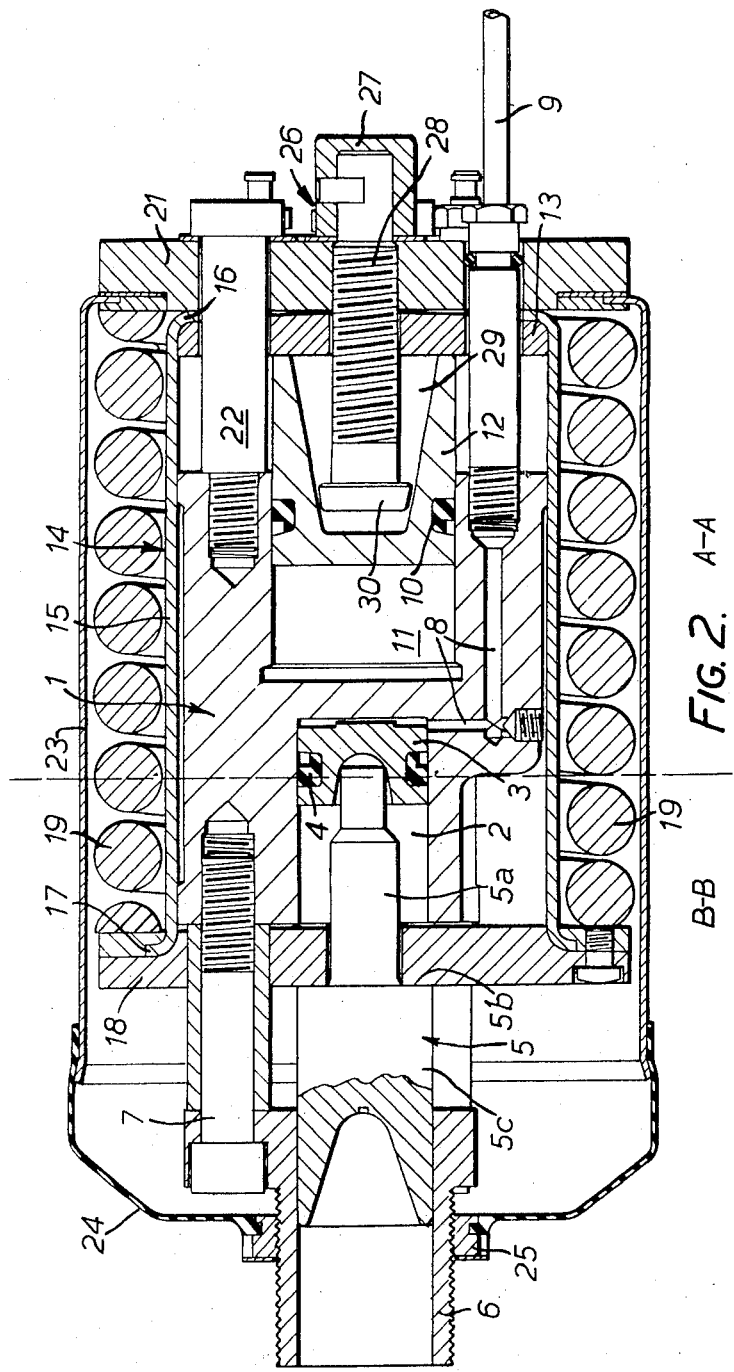
FIG. 2. A-A

VEHICLE BRAKE ACTUATORS

This invention relates to fluid pressure operated actuators for vehicle brakes, which actuators control the vehicle brakes for normal service operation and for parking.

It is known for actuators to have two pressure fluid chambers having pistons slidable therein, together with a spring, the brake being controlled for normal service operation by the action of a piston in one of the chambers and for parking by the action of the spring through both pistons. Thus, the pistons are interconnected, for parking brake operation, by a rod passing through a wall between the chambers necessitating the use of seals around the rod to separate the chambers.

According to the present invention there is provided a vehicle brake actuator comprising an output member subject to the action of a first fluid operable member working in a first cylinder which is pressurised to apply the brake, and to the action of resilient means biasing the output member to apply the brake, and a second fluid operable member working in a second cylinder independently of the first fluid operable member, which second cylinder is normally pressurised, in use, to relieve the output member of the biasing force of the resilient means, wherein the first fluid operable member and the resilient means act on the output member independently of and in parallel with each other.

An advantage of an actuator in accordance with with the invention is that when the resilient means acts on the output member to apply the brake the first fluid operable member does not move with the output member. Thus, the undesirable formation of a partial vacuum in the first cylinder is avoided, and the possibility of air being drawn into the fluid system due to movement of the first fluid operable member is eliminated.

A brake actuator in accordance with the invention will now be described, by way of example, with reference to the accompanying drawings, in which:

FIG. 1 is an end view of the actuator; and
FIG. 2 is a sectional view taken partly along the line A—A and partly along the line B—B of FIG. 1.

Referring to FIG. 2, the brake actuator comprises a main body portion 1 in one end of which a blind bore is formed to provide a cylinder 2. A piston 3 with a circumferential seal 4 is slidable within the cylinder 2 and abuts a stepped push rod 5 which extends outwardly and is slidable in a guide member 6 attached, as by bolts 7, to the main body portion 1. The push rod 5 may be connected to a conventional wedge actuator (not shown) for actuation of the vehicle brakes. The inner end of the cylinder 2, i.e., the right-hand end as shown in FIG. 2, communicates through bores 8 in the main body portion 1, pipe 9 and a valve arrangement (not shown) with a pressure source (not shown), such as an accumulator.

At the other end of the main portion 1 a further blind bore is formed to provide a cylinder 11, in this case of larger diameter than the cylinder 2, although it could alternatively be of smaller diameter, the cylinders 2 and 11 being co-axial. A piston 12 having a circumferential seal 10 is slidable within the cylinder 11 which communicates through bores in the main portion 1, pipes (not shown) and a valve arrangement (also not shown) with the pressure source. The outer end, to the right as shown in FIG. 2, of the piston 12 is in abutting contact with an end member 13 of a generally cylindrical internal housing 14 which has an intermediate member 15 having at one end an inwardly directed flange 16 upon which member 13 seats and at the other end an outwardly directed flange 17 which is connected to another end member 18.

The member 18 has a central aperture through which a portion 5a of push rod 5 passes. One of the steps in the piston rod provides a shoulder 5b separating the portion 5a from an enlarged diameter portion 5c and against which the member 18 can abut. The internal housing 14 is spring biased to the left as seen in FIG. 2 by a spring 19 seating at one end against the member 18 and at its other end against an end fitting 21, which is secured to the main portion 1, for example by bolts 22. A cylindrical outer housing 23, preferably of suitable plastics material, is connected at one end to the fitting 21 and shrouds the main portion 1, internal housing 14 and spring 19 to prevent dirt from entering the actuator. At the other end a flexible sealing cap 24 fits over the outer housing 23. A threaded nut 25 is attached to the cap 24 at an aperture in the cap, the threaded nut 25 being secured on to the correspondingly threaded guide member 6.

It will be seen that only two seals are required in the above-described arrangement, one seal on each piston 3, 12. Further, both piston and cylinder assemblies are contained within the axial dimensions of the spring 19, thus reducing the overall length of the actuator in comparison to known actuators.

The operation of the brake actuator will now be described. In the normal operating position shown in FIG. 2 in which the brake is inoperative, the cylinder 11 is pressurised and the piston 12 holds the end member 13 and thus the internal housing 14 to the right against the action of the spring 19. In this normal position the cylinder 2 is unpressurised, and the piston is held in the position shown by biasing means (not shown), such as the brake return spring, acting upon the push rod 5.

When the service brake is actuated, the valve arrangement associated with the pressure supply to cylinder 2 is actuated to allow pressurised fluid to pass into the cylinder 2 to move the piston 3 and associated push rod 5 to the left as seen in FIG. 2 to apply the brake.

Upon release of pressure in the cylinder 2 the piston 3 and push rod 5 return under the action of the biasing means to the position shown in FIG. 2 and the brake is released. To apply the brake for parking on an incline, the service brake is applied as described above and the pressures in the cylinders 2 and 11 are decreased simultaneously so that the push rod 5 and piston 3 move to the right under the action of the biasing means while piston 12 moves to the left, under the action of the spring 19. The member 18 abuts against the shoulder 5b of push rod 5 which is moved to the left out of abutting contact with the piston 3, and the brake is held applied by the force of spring 19. Of course, the member 18 abuts the shoulder 5b before the braking applied by the service brake actuation falls below a minimum level required to prevent rolling of the vehicle. To release the brake the procedure is reversed.

If the brake is to be applied for parking when the vehicle is on the level, there is no need firstly to actuate the service brake. In this case the pressure in the cylinder 11 is released so that spring 19 moves the member 18 to the left to contact the push rod 5 and apply the brake for parking. It will be appreciated that the piston 3 does not move with the push rod 5, and thus the undesirable formation of a partial vacuum to the right of the piston 3 is avoided.

A manual hold-off mechanism 26 is provided to release the brake should the pressure fluid supply to the cylinder 11 fail. The mechanism comprises a nut 27 keyed to a bolt 28 which extends through the fitting 21, with which it is in threaded engagement, and through end member 13 into a recess 29 formed in the piston 12. The bolt 28 has a head 30 which, when the bolt 28 is rotated to move to the right, engages the end member 13 to move the internal housing 14 to the right and compress the spring 19, thus allowing the push rod 5 to return to the right to release the brake. Piston 12 is in abutting engagement with the end member 13 and therefore does not move with the end member when the manual hold-off mechanism is operated, thus preventing the undesirable formation of a partial vacuum in the cylinder 11 to the left of piston 12.

The prevention of the partial vacuums referred to above eliminates the possibility of air being drawn into the hydraulic system which air would reduce braking efficiency.

In order to safeguard against service brake failure, two pistons may be provided to actuate the push rod 5, the pistons being disposed in tandem or in parallel and actuated by independent pressure circuits. Similarly, two pistons may be provided to hold off the spring 19, again the pistons being in tandem or parallel and being actuated by the independent pressure circuits. Thus, if one of the circuits were to fail, then there would be sufficient pressure in the other circuit to provide at least partial service braking and to hold off the parking brake spring.

It will be appreciated that the abovedescribed actuator can be made as a relatively cheap, compact, easily assembled unit.

We claim:

1. An actuator for a vehicle brake comprising an output member moveable between brake applied and released positions, resilient means operatively connected to said output member and biasing it towards its brake applied position, a first fluid operable member working in a working chamber of a first cylinder and operatively connected to said output member parallel with but independently of said resilient means to move said output member to its brake applied position in response to fluid pressure in said first cylinder, a second fluid operable member working in a working chamber of a normally pressurized second cylinder and operatively connected to said resilient means to relieve said output member of the biasing force of said resilient means, and a common, fixed, solid partition wall separating said working chamber of said first and second cylinders and preventing fluid communication therebetween.

2. An actuator according to claim 1, wherein the operative connection between said first fluid operable member and said output member is a simple abutting engagement so as to enable said output member to move independently of said first fluid operable member.

3. An actuator according to claim 1, wherein said resilient means comprises a coil compression spring, said first and second fluid pressure operable members and cylinders being wholly contained within said coil spring.

4. An actuator according to claim 1, including an inner housing comprising one end member arranged to abut said output member, another end member arranged to abut said second fluid operable member, and an intermediate member connected to said end members, and means operatively connecting said inner housing and said resilient means so that the biasing force thereof acts on said inner housing.

5. An actuator according to claim 4, including hold-off means for manually preventing said spring means from applying the brake, wherein said hold-off means comprises a manually axially movable member arranged to engage said other end member of said inner housing and move said inner housing axially to relieve said output member of said resilient means biasing force.

6. An actuator according to claim 1, including a main body portion, the working chambers of said first and second cylinders being constituted by oppositely directed blind bores formed in said body portion and defining therebetween a common solid partition wall separating said bores.

* * * * *